United States Patent
Phillips

(10) Patent No.: US 9,032,669 B1
(45) Date of Patent: May 19, 2015

(54) AUTOMOTIVE DOOR WITH SHATTER-RESISTANT MOVABLE SIDE WINDOW FOR ENHANCED OCCUPANT RETENTION

(71) Applicant: Donald R. Phillips, Arlington, TN (US)

(72) Inventor: Donald R. Phillips, Arlington, TN (US)

( * ) Notice: Subject to any disclaimer, the term of this patent is extended or adjusted under 35 U.S.C. 154(b) by 0 days.

(21) Appl. No.: 14/617,207

(22) Filed: Feb. 9, 2015

Related U.S. Application Data

(63) Continuation of application No. 12/389,624, filed on Feb. 20, 2009, now abandoned.

(51) Int. Cl.
*B60J 5/04* (2006.01)
*B60J 1/17* (2006.01)
*B60J 1/00* (2006.01)

(52) U.S. Cl.
CPC *B60J 5/0402* (2013.01); *B60J 1/17* (2013.01); *B60J 1/008* (2013.01)

(58) Field of Classification Search
CPC ............ B60J 5/0402; B60J 1/17; B60J 1/008; B60J 10/04; B32B 17/10293; B32B 17/10302; B32B 17/10366
USPC ........ 49/440, 441, 501, 502; 296/35.2, 146.2, 296/146.5, 146.6, 146.14–146.16, 187
See application file for complete search history.

(56) References Cited

U.S. PATENT DOCUMENTS

| | | | |
|---|---|---|---|
| 1,375,914 A | 4/1921 | Kimbark | |
| 1,610,302 A | 12/1926 | McKittrick | |
| 1,876,589 A * | 9/1932 | Ball | 49/502 |
| 3,032,351 A | 5/1962 | Lewis, Jr. | |
| 3,162,281 A | 12/1964 | Kraska et al. | |
| 3,204,981 A | 9/1965 | Edwards | |
| 4,823,511 A | 4/1989 | Herliczek et al. | |
| 4,910,074 A | 3/1990 | Fukawa et al. | |
| 5,007,201 A * | 4/1991 | D'Hoore et al. | 49/348 |
| 5,613,325 A | 3/1997 | Mariel | |
| 5,707,695 A | 1/1998 | Ramanujam | |
| 5,858,483 A | 1/1999 | Ramanujam | |
| 5,867,942 A * | 2/1999 | Kowalski | 49/502 |
| 6,036,255 A | 3/2000 | Lester et al. | |
| 6,364,397 B1 * | 4/2002 | Bordeaux et al. | 296/146.2 |
| 6,886,881 B1 | 5/2005 | Henderson et al. | |
| 7,392,618 B2 | 7/2008 | Watanabe et al. | |
| 7,806,462 B2 * | 10/2010 | Horneck | 296/146.2 |
| 2004/0160688 A1 | 8/2004 | Noguchi et al. | |
| 2004/0201253 A1 * | 10/2004 | Kitagawa et al. | 296/187.03 |
| 2005/0266187 A1 | 12/2005 | Smith et al. | |
| 2008/0032104 A1 | 2/2008 | Mannheim Astete et al. | |
| 2009/0048741 A1 * | 2/2009 | Pipkorn | 701/45 |

* cited by examiner

*Primary Examiner* — Katherine Mitchell
*Assistant Examiner* — Justin Rephann
(74) *Attorney, Agent, or Firm* — Howson & Howson LLP

(57) ABSTRACT

A vehicle side window, composed of HPR laminated glazing or advanced ejection mitigating laminated glazing, is provided with an inverted U-shaped channel, bonded to its upper edge, and extending into side channels of the door frame. The inverted U-shaped channel acts as a movable upper door channel, providing the door glazing with sufficient rigidity and pull-out resistance that it performs in an accident as if it were fully rolled up.

14 Claims, 1 Drawing Sheet

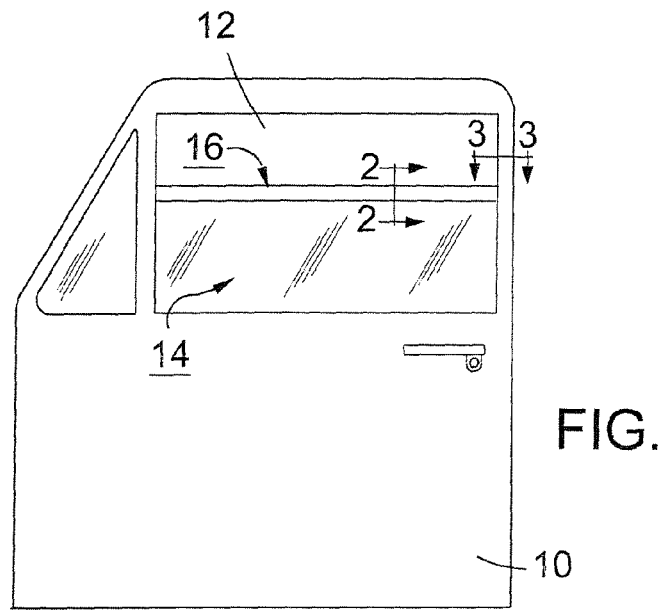
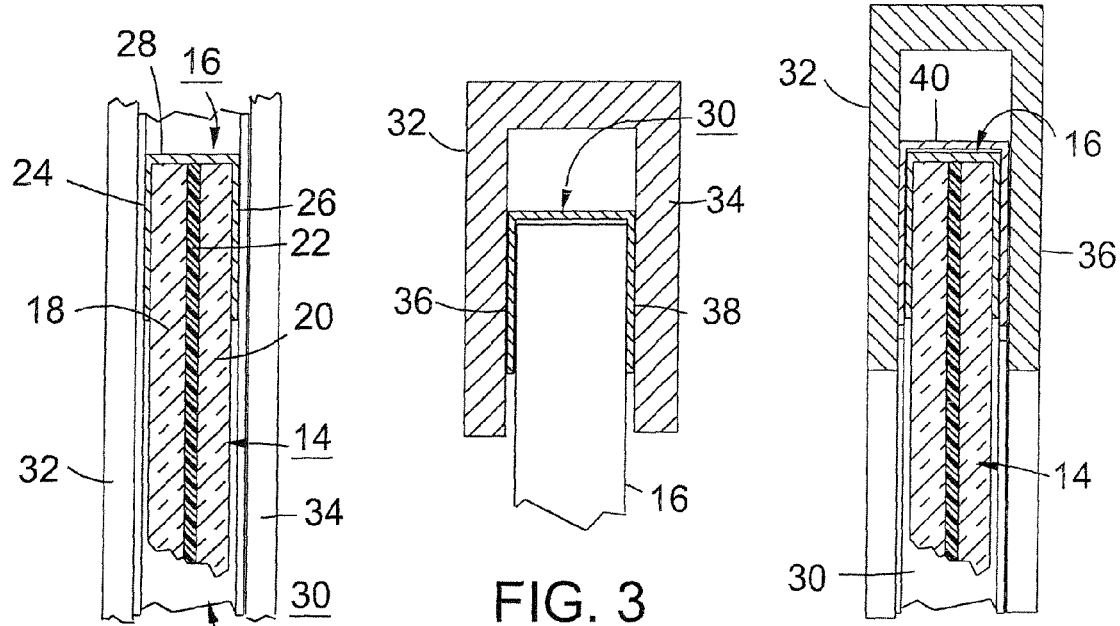

AUTOMOTIVE DOOR WITH SHATTER-RESISTANT MOVABLE SIDE WINDOW FOR ENHANCED OCCUPANT RETENTION

CROSS REFERENCE TO RELATED APPLICATION

This application is a continuation of application Ser. No. 12/389,624, filed Feb. 20, 2009, the entire disclosure of which is here incorporated by reference.

FIELD OF THE INVENTION

This invention relates to automotive doors, having side windows, and particularly to improvements in the safety of such windows in side impact collisions and rollovers.

BACKGROUND OF THE INVENTION

In automobile collisions, it is common for a side mirror or other outside object to cause a tempered glass door window to fracture and then vacate the opening. Inertia can then cause a driver's or passenger's head or body to strike against the door window. In order to minimize injury resulting from a full or partial ejection, it is desirable to use window glass that deforms without shattering and vacating the opening, thereby absorbing impact and reducing the forces sustained by the passenger or driver. At the same time, it is important to mitigate full or partial ejection, that is, to prevent the head or other body parts from passing though the window opening in order to minimize the risk of injury and other serious consequences of full or partial ejection.

These problems have been addressed over many years by various improvements in automotive window glass. HPR (High Penetration Resistance) interlayer laminated glazing is a type of laminated glass introduced in the early 1960s, and is composed of a thin (e.g., 0.030 inch) layer of polyvinyl butyral (PVB) sandwiched between two layers of glass. The adhesion between the PVB layer and the glass layers is lower than the adhesion in earlier forms of laminated automotive glass, and the decreased adhesion has been found to increase penetration resistance significantly.

HPR glazing is now available in a heat-strengthened form, in which the two layers of glass used to form the PVB sandwich are tempered by thermal treatment.

Another form of HPR glazing is known as "advanced ejection mitigation glazing." In this form of glazing, additional layers of PVB, and polyester films, similar to those used in so-called "Hurricane Glass" used in construction trades, are incorporated into the laminate in order to increase penetration resistance, and to maximize occupant containment.

Because most motor vehicle side windows in doors are designed to be opened by rolling them downward into a door frame, either manually or by the use of an electric motor, it is impossible to adhere the upper edge and the sides of the window to the door frame or window channel. Therefore, special measures need to be taken to prevent the window from moving out of the window channel in the door frame as a result of impact. In U.S. Pat. No. 4,823,511, for example, an automotive door window includes a retention shield in the form of a layer of PVB, polycarbonate resin, or acrylic resin, and an edge support molded onto peripheral vertical edge portions of the retention shield, in order to prevent the movable window assembly from releasing from the surrounding door frame when pressure is applied to the window. In U.S. Pat. Nos. 5,707,695 and 5,858,483, a channel is provided in the door frame. The door frame channel has flanges that prevent the laminated glass from dislodging from the channel during crash incidents.

A vehicle side window composed of HPR laminated glazing and advanced ejection mitigation laminated glazing is effective to mitigate ejection when it is fully rolled up and seated in the side window channels and upper window channel in the door frame. However, when the window is partly open, crash forces can cause the upper edge of the window to deform excessively, and pull the side edges out of their channels, so that, although the laminated glass provides containment superior to that of tempered glass, it does not meet its full potential as protection against full or partial ejection, and the risk of injury is increased.

SUMMARY OF THE INVENTION

A purpose of the invention is to provide a vehicle side window with the ability to absorb impact, even when the window is partially open, and even after the window is struck by an outside object and cracked. The improvement reduces the likelihood of full or partial ejection in a collision or rollover. Briefly, a side window composed of HPR laminated glazing or advanced ejection mitigating laminated glazing is provided with an inverted U-shaped channel, bonded to its upper edge, and extending into side channels of the door frame. The inverted U-shaped channel acts as a movable upper door channel, providing the door glazing with sufficient rigidity and pull-out resistance that it performs in a crash as if it were fully rolled up.

The automotive vehicle door according to the invention comprises a door frame having inner and outer door panels, and a window opening formed in an upper portion of the door frame. A laminated sheet of window glass having an upper bonded edge, is movable upward from within a space between the inner and outer door panels to a position in which the sheet substantially closes the window opening. The sheet of window glass is also adjustable so that its upper edge can be positioned at an intermediate location within the window opening.

A first horizontally elongated channel receives the upper edge of the sheet of window glass. The channel has a U-shaped cross-section and is composed of two parallel, horizontally elongated strips having inner faces in parallel opposed relation to each other and spaced by a distance substantially equal to the thickness of the laminated sheet of window glass. These strips also have outer faces in parallel, spaced relationship to each other, and are bridged by a third horizontally elongated strip so that the channel has a horizontally elongated opening between its two parallel, horizontally elongated strips for receiving the upper edge of the sheet of window glass. The channel is bonded to the sheet of window glass and is composed of steel, rigid plastics, or other rigid material, having a vertical dimension of at least about 1 inch, and, preferably, a thickness of at least 0.035 inch.

Two vertically elongated channels are fixed to the door frame and positioned on opposite sides of the window opening. Each of the vertically elongated channels has a U-shaped cross-section and is composed of two parallel, vertically elongated strips having faces in opposed relation to each other and spaced from each other by a distance substantially equal to the spacing of the outer faces of the parallel strips of the first horizontally elongated channel. The vertically elongated strips of each vertically elongated channel are bridged by a third vertically elongated strip, and each vertically elongated channel has a vertically elongated opening between its two parallel, vertically elongated, strips. The vertically elongated openings of the two vertically elongated channels face each other.

The sheet of window glass extends into both of the vertically elongated channels, and the first horizontally elongated channel also extends into both of said vertically elongated channels.

Each of the vertically elongated channels is also preferably composed of steel having a thickness of at least 0.04 inch and each of the vertically elongated channels also preferably has a depth, measured from its third vertically elongated strip to its vertically elongated opening, of at least 1 inch.

Preferably, the first horizontally elongated channel extends into each of the vertically elongated channels by a distance of at least 1 inch, and in a preferred embodiment, the horizontally elongated channel extends into the vertically elongated channels substantially to their full depths.

In the preferred embodiment, a second horizontally elongated channel is fixed to the door frame and located at the top of the window opening. This second horizontally elongated channel is composed of two parallel, horizontally elongated strips having inner faces in parallel opposed relation to each other and spaced by a distance substantially equal to the spacing of the outer faces of the parallel strips of the first horizontally elongated channel bonded to the upper edge of the sheet of window glass. The horizontally elongated strips of the second horizontally elongated channel are bridged by a horizontally elongated strip, and the second horizontally elongated channel has a horizontally elongated, downwardly facing opening between its two parallel, horizontally elongated strips. This second horizontal channel is positioned to receive the first horizontally elongated channel when the laminated sheet of window glass is moved to the position in which the sheet substantially closes the window opening.

BRIEF DESCRIPTION OF THE DRAWINGS

FIG. 1 is an elevational view of a vehicle door in accordance with the invention;

FIG. 2 is a cross-sectional view, as seen through section plane 2-2 in FIG. 1, showing the window in a partially open position and showing the cooperation of the reinforcing channel on the top of the sheet of laminated window glass with a vertical channel in the door frame;

FIG. 3 is a cross-sectional view, as seen through section plane 3-3 in FIG. 1; and FIG. 4 is a cross-sectional view showing the window in its closed condition, and showing the cooperation of the reinforcing channel on the top of the sheet of laminated window glass with a horizontal channel in the upper part of the door frame.

DETAILED DESCRIPTION OF THE PREFERRED EMBODIMENTS

As shown in FIG. 1, the vehicle side door 10 has a window opening 12 in which a vertically movable window 14 is shown in a partially open position. The window is composed of a sheet of laminated glass, preferably a sheet of HPR laminated glazing, having an inverted U-shaped reinforcing channel 16 bonded to its upper edge, preferably by polyurethane adhesive.

As shown in FIG. 2, the window 14 is composed of two layers 18 and 20 of annealed or heat-strengthened glass with a 0.030 inch layer 22 of PVB between them. The total thickness of an automobile side window 14 is typically in the range of 3.9 mm to 5 mm. The U-shaped reinforcing channel 16 is preferably made by bending a sheet of mild steel having a thickness of at least 0.030 inch (0.76 mm), and preferably at least about 0.035 inch (0.89 mm). The channel is composed of two spaced, parallel, horizontally elongated strips 24 and 26, connected by a strip 28 at their upper edges. The spacing between the strips 24 and 26 depends on the thickness of window 14, and can accordingly range from about 3.9 mm to about 5 mm. The height of strips 24 and 26 should be at least about 1 inch, i.e. at least about 25 mm.

As shown in FIGS. 2 and 3, channel 16 extends into a vertical channel 30, anchored between inner and outer door panels 32 and 34 on one side of the window opening 12. A substantially identical vertical channel (not shown in FIG. 1) is anchored between the inner and outer door panels on the opposite side of the window opening. Channel 30 is preferably formed by bending a sheet of mild steel having a thickness of at least about 0.04 inch (1 mm) and an internal depth of about 1 inch (25 mm). The spacing between the sides 36 and 38 of channel 30 should be such as to fit channel 16 snugly while allowing channel 16 to slide vertically. The end of channel 16 preferably extends to the full depth of channel 30, as shown in FIG. 3, which is preferably at least about 1 inch (25 mm). The opposite end of channel 16 likewise extends to the full depth of the opposite vertical channel.

As shown in FIG. 4, a horizontally elongated top channel 40 is anchored between door panels 32 and 34 at the top of the window opening 12. Channel 40 is similar to channel 30, with its parallel strips spaced by a distance slightly greater than external width of channel 16 so that channel 16 can fit snugly into channel 40 when the window is fully closed.

The door according to the invention, having a top channel with a height of one inch and a sheet thickness of 0.035 inch, and extending one inch into vertical side channels, has been tested extensively. The window, when partially open as in FIG. 1, has been found capable of sustaining and absorbing impacts at speeds exceeding approximately 12.5 miles per hour, with a 20 pound simulated passenger head, without the head passing through the glass.

With an upper edge channel having a height of at least about one inch, cooperating with, and extending approximately to the full depth of, opposed vertical side channels each having a depth of at least about one inch, the door window can effectively absorb impact without penetration by the 20 pound head form, in side impact collisions up to 12.5 miles per hour, with the window in a partially open condition, and previously cracked as a result of a prior strike. Thus, the invention has significant potential to mitigate personal injury in vehicle collisions. The invention has potential application in front side, rear side, and any other movable windows, in automobiles, trucks, SUVs and other vehicles.

Various modifications can be made to the door and window described. For example, the window glass can be advanced ejection mitigation glazing including plural layers of PVB, and polyester films. The dimensions of the top channel can be varied, but its thickness should be at least about 0.03 inch (0.76 mm) and its height should be at least about 1 inch (25 mm). The vertical side channels can be bowed in order to conform to convex windows, and the top channel 16 can be shaped to fit vehicle door windows having rounded corners. Various other modifications can be made without departing from the scope of the invention as defined in the following claims.

What is claimed is:

1. A door for an automotive vehicle comprising:
   a door frame having inner and outer door panels, a window opening formed in an upper portion of the door frame;

a laminated sheet of window glass having an upper edge, and movable upward from within a space between the inner and outer door panels from a fully open position to a fully closed position in which the sheet substantially closes said window opening, and adjustable to position its upper edge at an intermediate location within said opening;

a first horizontally elongated channel having a U-shaped cross-section and composed of two parallel, horizontally elongated strips having inner faces in parallel opposed relation to each other and spaced by a distance substantially equal to the thickness of said laminated sheet of window glass, said strips also having outer faces in parallel, spaced relationship to each other, said horizontally elongated strips being bridged by a third horizontally elongated strip and having a horizontally elongated opening between its two parallel, horizontally elongated strips, said upper edge of the laminated sheet of window glass extending into said first horizontally elongated channel and being bonded to first horizontally elongated channel; and a pair of vertically elongated vertical channels, each having a U-shaped cross-section and composed of two parallel, vertically elongated strips having faces in opposed relation to each other and spaced from each other by a distance substantially equal to the spacing of the outer faces of the parallel strips of the first horizontally elongated channel, said vertically elongated strips being bridged by a third vertically elongated strip, each vertically elongated channel having a vertically elongated opening between said two parallel, vertically elongated strips, the two vertically elongated channels being fixed to the door frame and positioned on opposite sides of said window opening with their vertically elongated openings facing each other;

in which the laminated sheet of window glass extends into both of said vertically elongated channels, and said first horizontally elongated channel also extends into both of said vertically elongated channels throughout the movement of the laminated sheet from its fully open position to its fully closed position;

in which the thickness of each of the strips of which the first horizontally elongated channel is composed is at least 0.030 inch; and in which said first horizontally elongated channel is sufficiently rigid, and extends into said vertically elongated channels by a sufficient distance throughout the range of travel of said window glass in which said window glass can be struck by a passenger's head, and said window glass extends into said first horizontally elongated channel to a sufficient depth, that, upon impact against said window glass by a 20 pound head form traveling perpendicularly to said window glass at a speed of 12.5 miles per hour, said horizontally elongated channel continues to extend into both of said vertically elongated channels, whereby said head form is prevented from passing through said window opening, when said window glass is in a partially opened condition within said range of travel.

2. A door according to claim 1, in which the height of each of the two parallel, horizontally elongated strips of the first horizontally elongated channel, measured vertically, is at least one inch throughout the length of said first horizontally elongated channel.

3. A door according to claim 1, in which each of said vertically elongated channels has a thickness of at least 0.04 inch, and in which each of said vertically elongated channels has a depth, measured from its third vertically elongated strip to its vertically elongated opening, of at least 1 inch.

4. A door according to claim 1, in which said first horizontally elongated channel extends into each of said vertically elongated channels by a distance of at least 1 inch throughout said range of travel of said window glass in which said window glass can be struck by a passenger's head.

5. A door according to claim 1, in which said first horizontally elongated channel extends into said vertically elongated channels to their full depths throughout said range of travel of said window glass in which said window glass can be struck by a passenger's head.

6. A door according to claim 1 having a second horizontally elongated channel fixed to the door frame and located at the top of the window opening, said second horizontally elongated channel being composed of two parallel, horizontally elongated strips having inner faces in parallel opposed relation to each other and spaced by a distance substantially equal to the spacing of the outer faces of the parallel strips of the first horizontally elongated channel, said horizontally elongated strips of the second horizontally elongated channel being bridged by a horizontally elongated strip and having a horizontally elongated, downwardly facing opening between its two parallel, horizontally elongated strips, said channel being positioned to receive the first horizontally elongated channel when the laminated sheet of window glass is moved to said position in which the sheet substantially closes said window opening.

7. A door according to claim 1 in which the first horizontally elongated channel is composed of steel.

8. A door according to claim 1 in which the first horizontally elongated channel is composed of steel having a thickness of at least 0.035 inch.

9. A door according to claim 1, in which each of said vertically elongated channels is composed of steel having a thickness of at least 0.04 inch, and in which each of said vertically elongated channels has a depth, measured from its third vertically elongated strip to its vertically elongated opening, of at least 1 inch.

10. A door according to claim 7, in which said first horizontally elongated channel extends into said vertically elongated channels by a distance of at least 1 inch throughout said range of travel of said window glass in which said window glass can be struck by a passenger's head.

11. A door according to claim 7, in which said first horizontally elongated channel extends into said vertically elongated channels to their full depths throughout said range of travel of said window glass in which said window glass can be struck by a passenger's head.

12. A door according to claim 7 having a second horizontally elongated channel fixed to the door frame and located at the top of the window opening, said second horizontally elongated channel being composed of two parallel, horizontally elongated strips having inner faces in parallel opposed relation to each other and spaced by a distance substantially equal to the spacing of the outer faces of the parallel strips of the first horizontally elongated channel, said horizontally elongated strips of the second horizontally elongated channel being bridged by a horizontally elongated strip and having a horizontally elongated, downwardly facing opening between its two parallel, horizontally elongated strips, said channel being positioned to receive the first horizontally elongated channel when the laminated sheet of window glass is moved to said position in which the sheet substantially closes said window opening.

13. A door according to claim 1, in which said laminated sheet of window glass is composed of two layers of glass with a layer of polyvinyl butyral sandwiched between said two layers of glass.

14. A door according to claim 1, in which said first horizontally elongated channel is substantially straight throughout its length.

* * * * *